(12) United States Patent
Matsumoto et al.

(10) Patent No.: US 8,596,113 B2
(45) Date of Patent: Dec. 3, 2013

(54) INTAKE AIR TEMPERATURE SENSOR AND THERMAL AIRFLOW METER INCLUDING THE SAME

(75) Inventors: Masahiro Matsumoto, Hitachi (JP); Hiroshi Nakano, Tokai (JP); Keiji Hanzawa, Mito (JP); Satoshi Asano, Hitachi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 13/360,923

(22) Filed: Jan. 30, 2012

(65) Prior Publication Data
US 2012/0192632 A1 Aug. 2, 2012

(30) Foreign Application Priority Data
Jan. 31, 2011 (JP) ................. 2011-017381

(51) Int. Cl.
*G01M 15/04* (2006.01)
(52) U.S. Cl.
USPC ..................................... 73/114.31
(58) Field of Classification Search
USPC ............... 73/114.31, 202.5, 204.26
See application file for complete search history.

(56) References Cited

U.S. PATENT DOCUMENTS

| | | | | |
|---|---|---|---|---|
| 5,780,735 | A * | 7/1998 | Kadohiro et al. | 73/202.5 |
| 7,269,999 | B2 * | 9/2007 | Nakano et al. | 73/202.5 |
| 7,360,415 | B2 * | 4/2008 | Nakano et al. | 73/204.26 |
| 7,631,555 | B2 * | 12/2009 | Nakano et al. | 73/204.15 |
| 7,661,877 | B2 * | 2/2010 | Kitahara | 374/138 |
| 2007/0089503 | A1 * | 4/2007 | Nakano et al. | 73/204.26 |

FOREIGN PATENT DOCUMENTS

JP 2005-9965 A 1/2005

* cited by examiner

*Primary Examiner* — Freddie Kirkland, III
(74) *Attorney, Agent, or Firm* — Crowell & Moring LLP

(57) ABSTRACT

An intake air temperature sensor capable of detecting an intake air temperature highly accurately and at high speed. The intake air temperature sensor of the present invention includes: a secondary passage 7 taking in an intake airflow; a flow rate detecting element 13 disposed in the secondary passage 7; an intake air temperature detecting element 4 provided outside the secondary passage; a temperature sensor 9 detecting a temperature of a fitting section of the intake air temperature detecting element 4; a circuit board 11 disposed in a casing; and an integrated circuit 10 applying a correction process to an output of the intake air temperature detecting element 4 on the basis of signals output from the temperature sensor 9 and a flow rate detecting element 13.

20 Claims, 18 Drawing Sheets

Output from flow rate detecting element 13

FIG. 25

$$V_r = \frac{R_{TH}}{R_{TH} + R_0} V_{cc}$$

$$V_m = \frac{R_{TH}}{R_{TH} + R_{45}} V_{cc}$$

$$V_r = \frac{R_{45} V_m}{R_{45} V_m + R_0 (V_{cc} - V_m)} V_{cc}$$

$V_r$ : True value of intake air temperature output $R_{TH}$ : Resistance of thermistor resistor $R_0$ : Reference value of fixed resistor 45

$V_{cc}$ : Power source voltage $V_m$ : Actual measurement value of intake air temperature output $R_{45}$ : Actual resistance of fixed resistor 45

INTAKE AIR TEMPERATURE SENSOR AND THERMAL AIRFLOW METER INCLUDING THE SAME

BACKGROUND OF THE INVENTION

1. Field of the Invention

The present invention relates to an intake air temperature sensor, and particularly to an intake air temperature sensor with little effect of the temperature of a sensor fixing member and self-heating of a circuit section, and a thermal airflow meter including the same.

2. Background Art

For instance, JP Patent Application Publication No. 2005-9965 A (2005) discloses an intake air temperature sensor in which an intake air temperature is detected based on information of a first temperature sensor disposed at a flow rate measuring element and a second temperature sensor disposed in a casing.

However, the technique described in JP Patent Application Publication No. 2005-9965 A (2005) does not give much consideration to air temperature variation in a secondary passage due to the temperature of a secondary passage structure, an effect on the second temperature sensor due to self-heating of circuits disposed in the casing, the thermal time constant of the casing from several tens of seconds to several minutes and the like.

The structure of the secondary passage has a temperature different from that of an airflow to be measured owing to heat from a sensor fixing member and self-heating of circuits. Accordingly, owing to adverse effects of heat from the structure of the secondary passage, the temperature of the air in the secondary passage is changed and becomes a temperature different from that of the airflow to be measured, which causes a problem in that an error occurs in an output of the intake air temperature sensor in the above technique.

Further, since variation in the temperature of the structure of the secondary passage is affected by the thermal time constant of the casing, several tens of seconds to several minutes are required to stabilize the temperature of the structure of the secondary passage. Accordingly, the above technique has a problem that the output of the intake air temperature sensor is unstable for several tens of seconds to several minutes after the intake air temperature is changed.

Variation in airflow rate varies the power consumption of a drive circuit for driving an airflow rate sensor and in turn varies the self-heating of the circuits. Here, time until the temperature of the casing is stabilized is also affected by the thermal time constant of the casing. Accordingly, it is required several tens of seconds to several minutes until an output from the second temperature sensor is stabilized. This causes a problem in that the output of the intake air temperature sensor, which is corrected on the basis of the output of the second temperature sensor, is also unstable for several tens of seconds to several minutes after the airflow rate varies.

SUMMARY OF THE INVENTION

Thus, the present invention has been made in view of the above situations. An object of the present invention is to provide an intake air temperature sensor capable of detecting an intake air temperature highly accurately and at high speed.

In order to solve the above problems, an intake air temperature sensor of the present invention is an intake air temperature sensor including a secondary passage having an opening for taking in a part of an intake airflow, a flow rate detecting element provided in the secondary passage, an electronic circuit electrically connected to the flow rate detecting element, and a circuit mounting board mounted with the electronic circuit, and further including a casing storing at least a part of the circuit mounting board, including: an intake air temperature detecting element provided outside the secondary passage; and a temperature sensor detecting a temperature around a fitting section of the intake air temperature detecting element; and further including means for correcting an output of the intake air temperature detecting element on the basis of an output of the temperature sensor and an output of the flow rate detecting element.

The present invention can reduce adverse effects of the temperature of the fitting section for the intake air temperature sensor and the self-heating of the circuit section. Accordingly, the present invention can provide an intake air temperature sensor capable of measuring an intake air temperature highly accurately and at high speed.

BRIEF DESCRIPTION OF THE DRAWINGS

FIG. 25 shows a method of correcting an output of an intake air temperature using a resistance of a fixed resistor.

DETAILED DESCRIPTION OF THE PREFERRED EMBODIMENTS

Embodiments of the present invention will hereinafter be described with reference to drawings.

Figure 1:
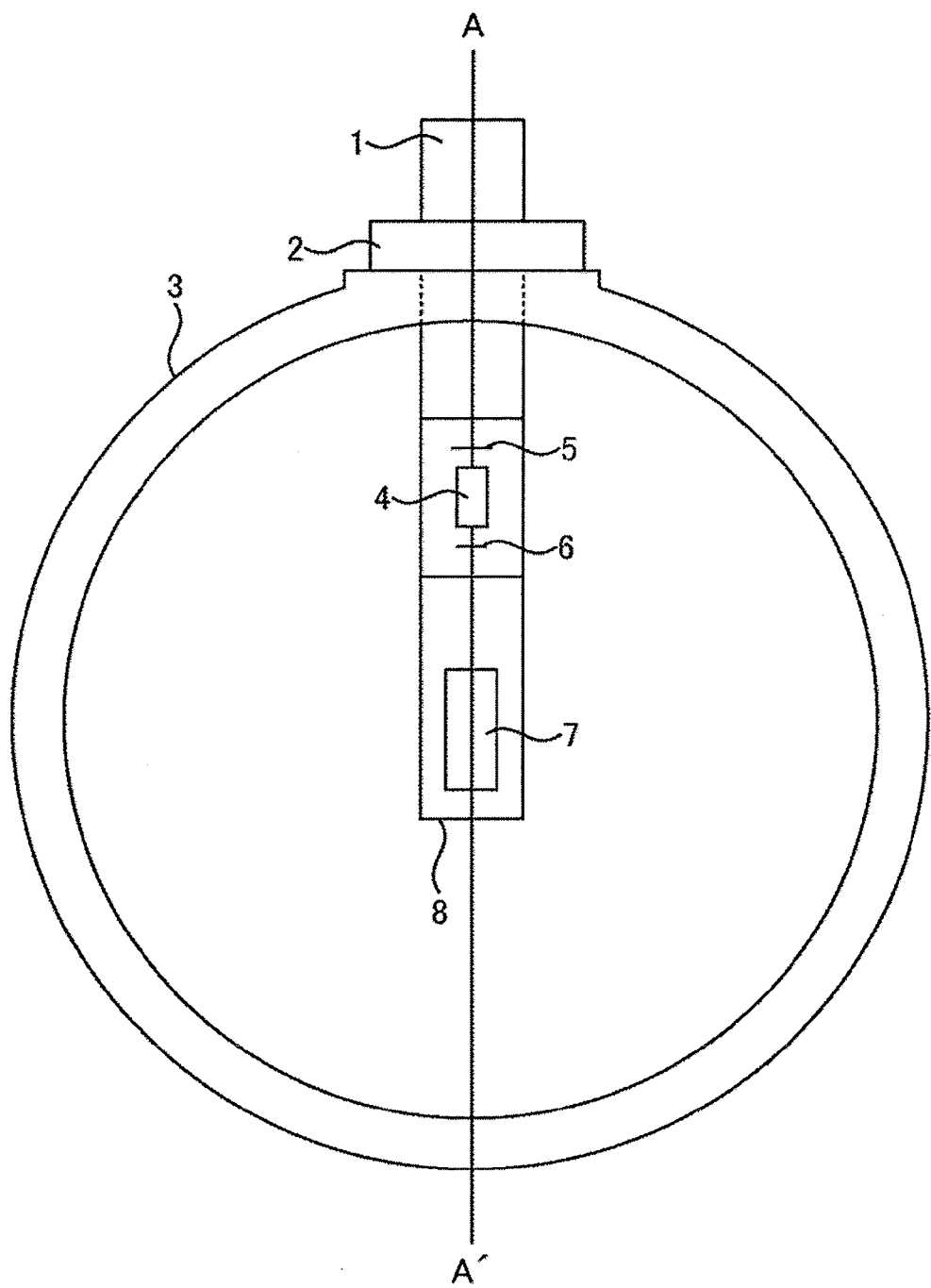
FIG. 1 is an implementation diagram showing a state where an intake air temperature sensor of a first embodiment is implemented in an intake pipe.
Figure 2:
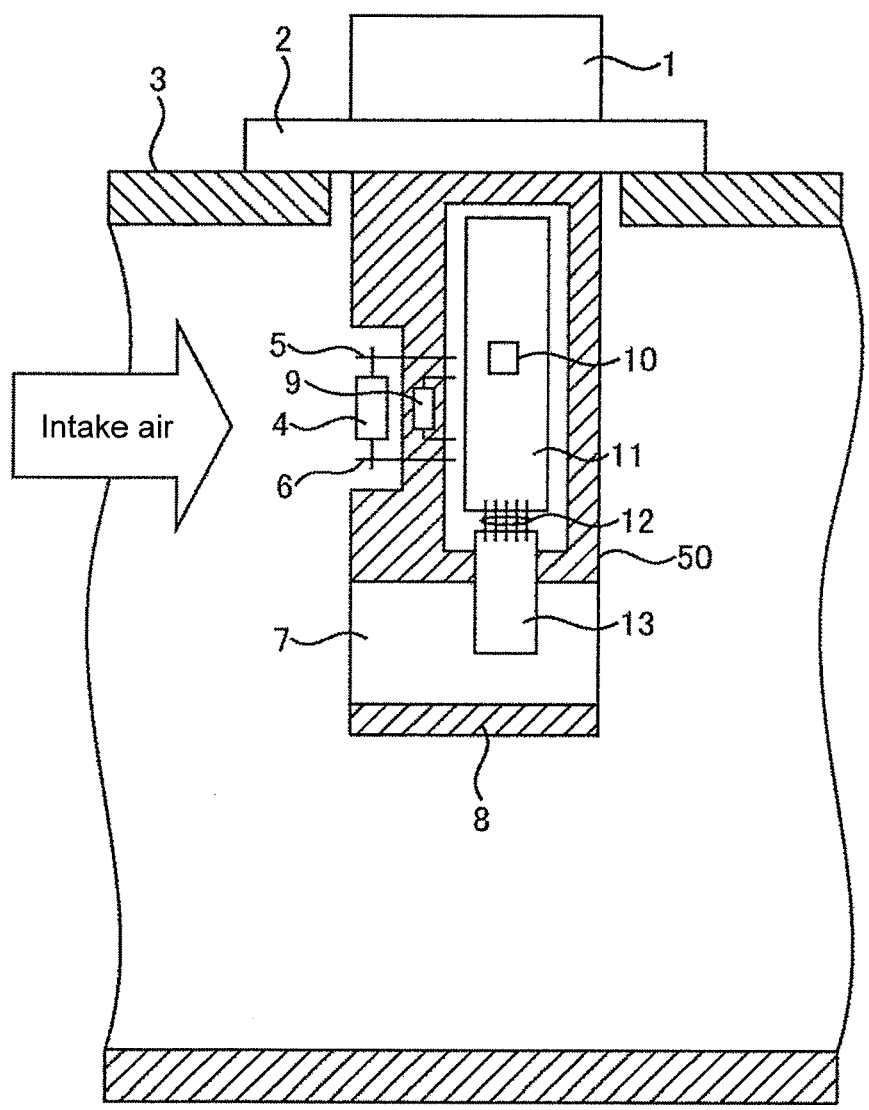
FIG. 2 is a sectional view taken along line A-A' of FIG. 1.
Figure 3:
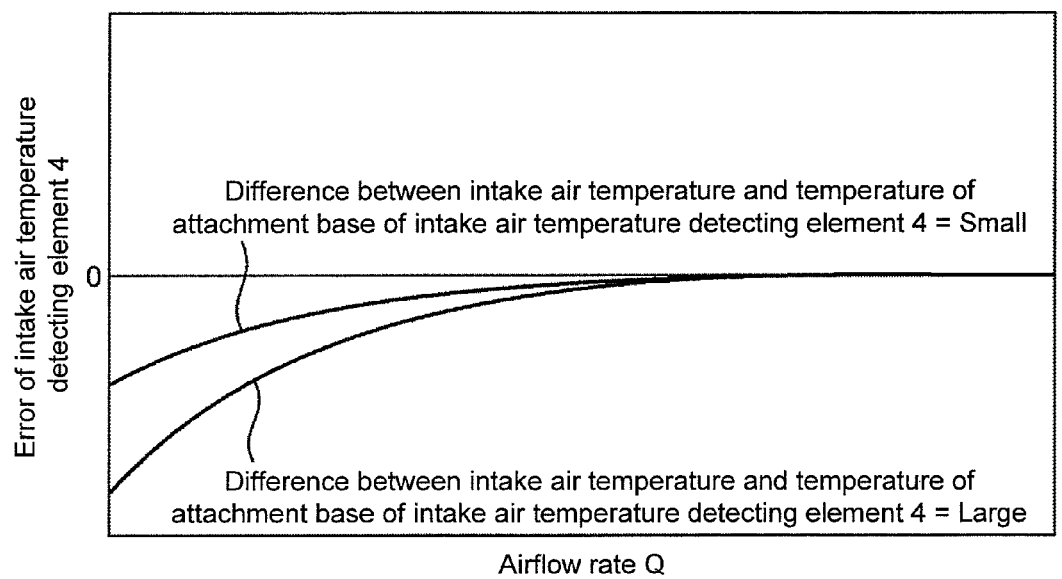
FIG. 3 shows characteristics of an intake air temperature detecting element 4.
Figure 4:
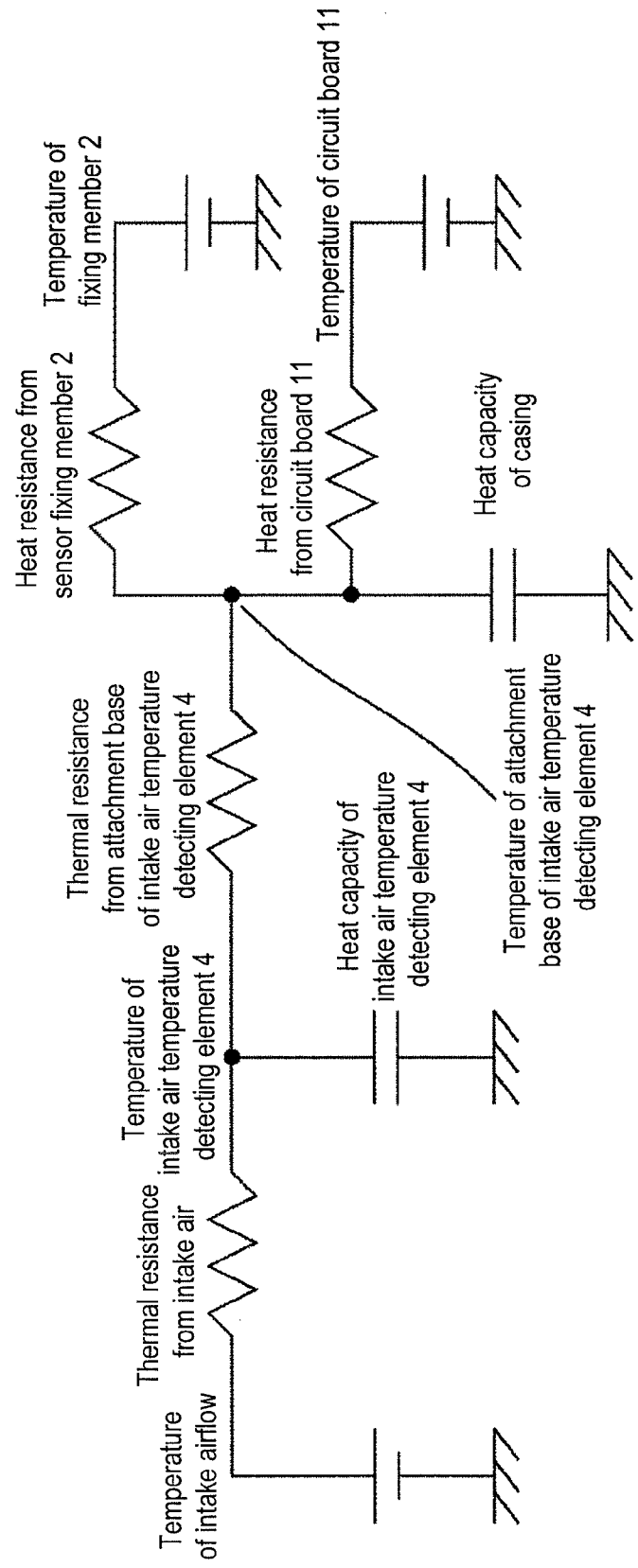
FIG. 4 shows a heat equivalent circuit of an intake air temperature sensor 8 of the first embodiment.
Figure 5:
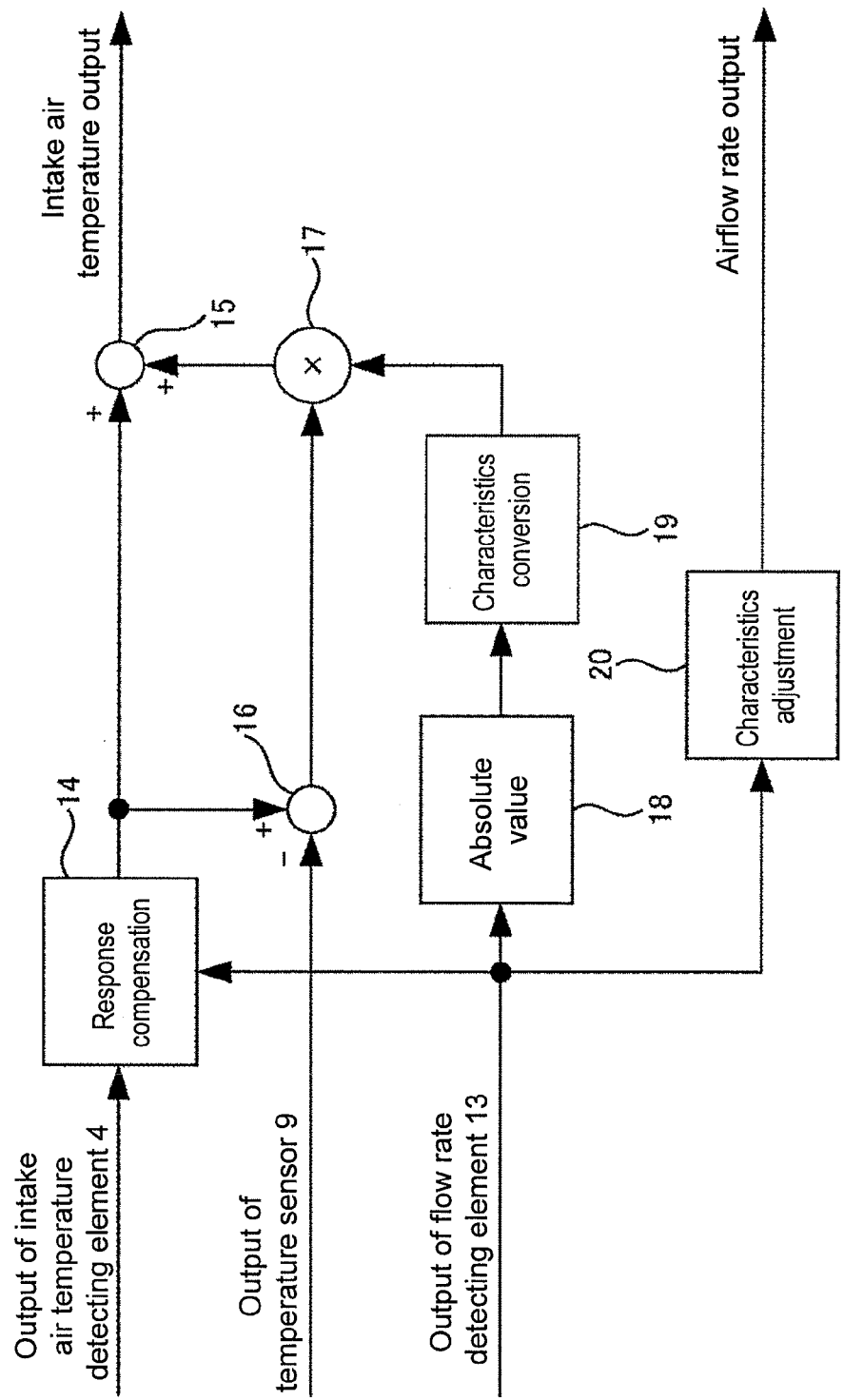
FIG. 5 shows a method of correcting the intake air temperature detecting element 4.
Figure 6:
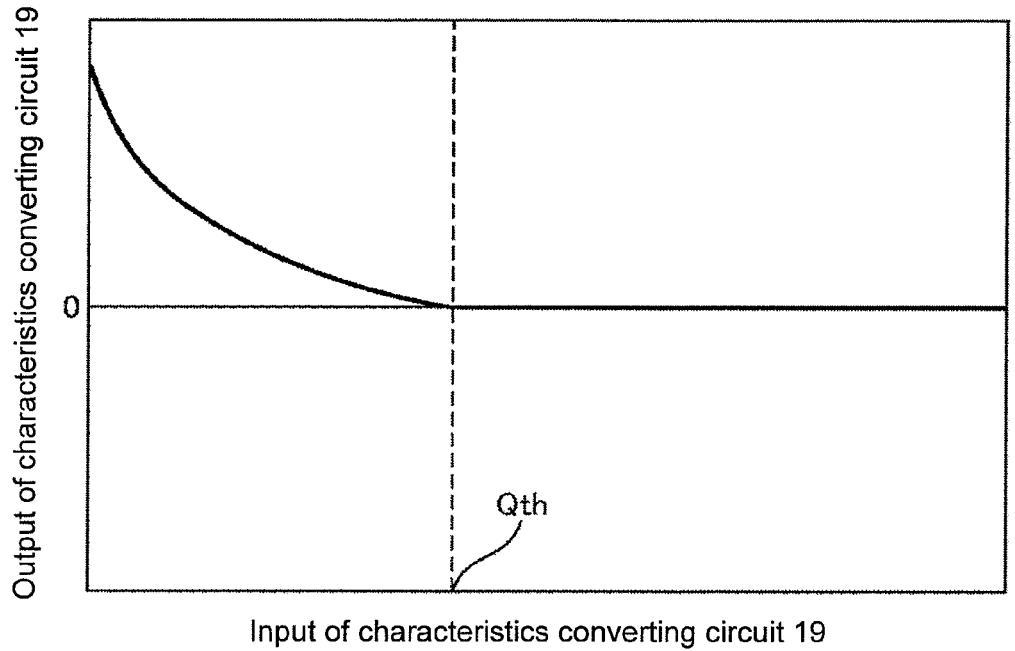
FIG. 6 shows input and output characteristics of a characteristics converting circuit 19.
Figure 7:
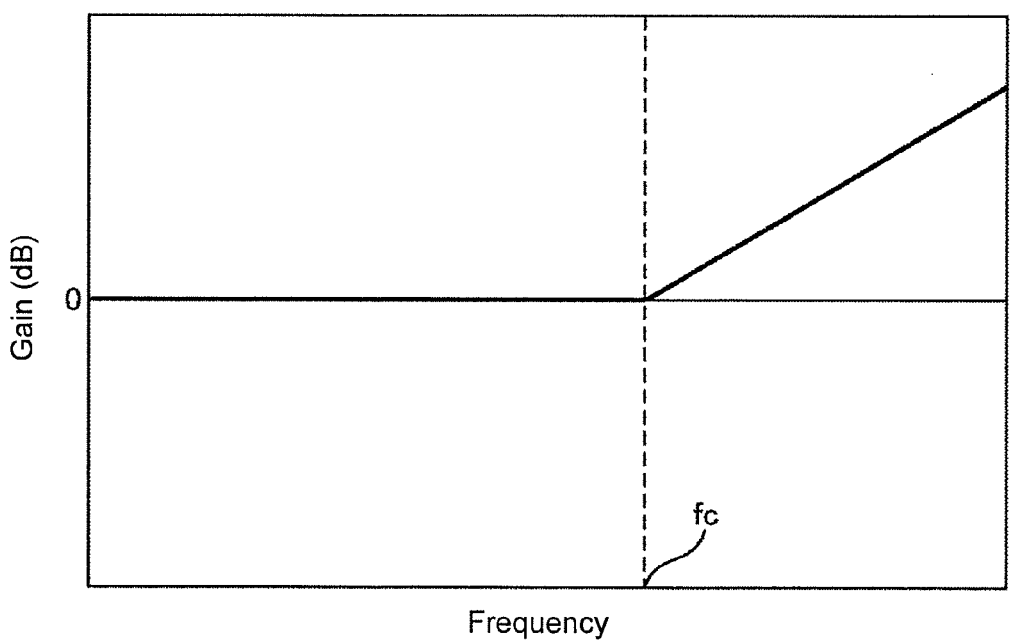
FIG. 7 shows frequency characteristics of a response compensation circuit 14.
Figure 8:
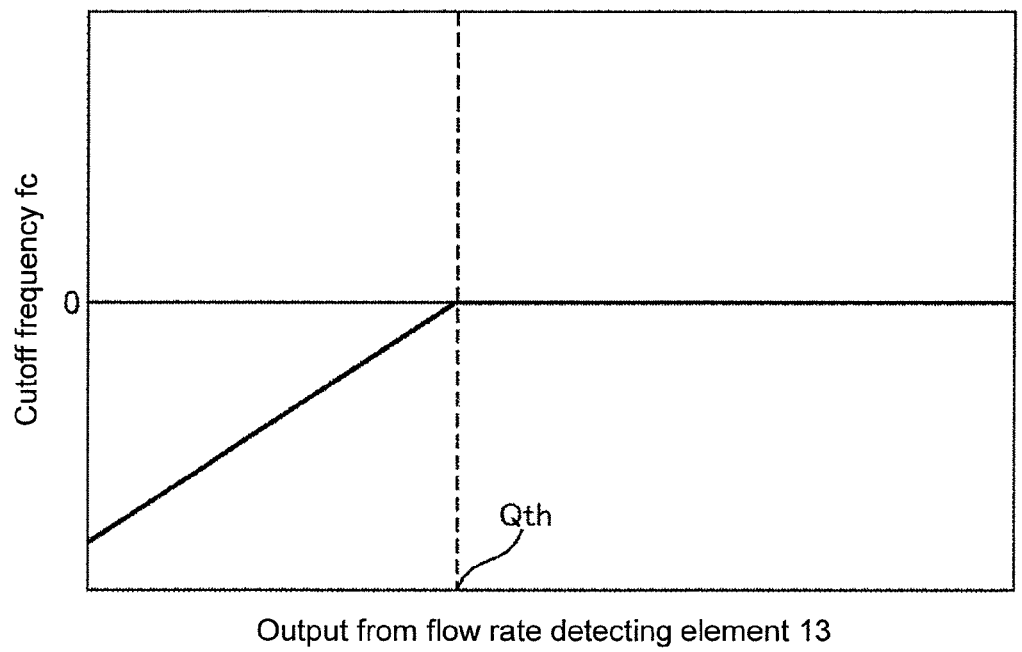
FIG. 8 shows a cutoff frequency of the response compensation circuit 14.

First, an intake air temperature sensor of a first embodiment of the present invention will be described with reference to FIGS. 1 to 8. FIG. 1 is an implementation diagram showing a state where the intake air temperature sensor of the first embodiment is implemented in an intake pipe. FIG. 2 is a sectional view taken along line A-A' of FIG. 1. FIG. 3 shows characteristics of an intake air temperature detecting element 4. FIG. 4 shows a heat equivalent circuit of an intake air temperature sensor 8 of the first embodiment. FIG. 5 shows a method of correcting the intake air temperature detecting element 4. FIG. 6 shows input and output characteristics of a characteristics converting circuit 19. FIG. 7 shows frequency characteristics of a response compensation circuit 14. FIG. 8 shows a cutoff frequency of the response compensation circuit 14.

As shown in FIG. 1, the intake air temperature sensor 8 of the first embodiment of the present invention is implemented so as to be inserted into an opening provided at the intake pipe 3. The intake air temperature sensor 8 is fixed in the intake pipe 3 by a sensor fixing member 2. Electric connection from the intake air temperature sensor 8 to the outside is made through a connector 1. The intake air temperature sensor 8 is provided with a secondary passage 7. An opening is provided at the secondary passage 7 so as to surround a part of an intake airflow.

As shown in FIG. 2, a flow rate detecting element 13 is disposed in a secondary passage 7 so as to allow a flow rate of an intake airflow flowing in the intake pipe 3. An intake air temperature detecting element 4 is fixed via fittings 5 and 6 so as to be exposed to the intake airflow. A temperature sensor 9 is disposed at a base of the fitting section of the intake air temperature detecting element 4 so as to detect the temperature of the fitting section of the intake air temperature detecting element 4. A circuit board 11 on which circuits are mounted is disposed in a casing 50. An integrated circuit 10, which detects output signals of the intake air temperature detecting element 4, the temperature sensor 9 and the flow rate detecting element 13, is disposed on the circuit board 11. The flow rate detecting element 13 is connected to the circuit board 11 by gold wire 12. The intake air temperature detecting element 4 and the temperature sensor 9 are composed by a thermistor, a platinum resistor, a thermocouple, or a resistor with a high temperature coefficient.

Next, characteristics of the intake air temperature detecting element 4 will be described with reference to FIG. 3. The intake air temperature detecting element 4 causes an error according to a difference between a temperature difference between an intake air temperature and a temperature of the attachment base of the intake air temperature detecting element 4 and a an airflow rate Q. This is because heat radiation from the surface of the intake air temperature detecting element 4 to the airflow becomes smaller with decrease in the airflow rate and thereby the intake air temperature detecting element 4 is affected by the temperature of the attachment base thereof.

The larger the temperature difference between the intake air temperature and the temperature of the attachment base of the intake air temperature detecting element 4, the error becomes larger. A heat equivalent circuit of the intake air temperature sensor 8 of this embodiment is represented as shown in FIG. 4. The temperature of the intake air temperature detecting element 4 depends on the temperatures of the intake airflow and the attachment base of the intake air temperature detecting element 4, and the thermal resistance between the intake airflow and the attachment base of the intake air temperature detecting element 4. That is, an error occurs in the temperature of the intake air temperature detecting element 4 according to the temperature difference between the attachment base of the intake air temperature detecting element 4 and the intake airflow. The thermal resistance from the intake airflow varies according to the airflow rate Q. The thermal resistance becomes high at a low flow rate. Accordingly, the effect of temperature from the attachment base of the intake air temperature detecting element 4 becomes larger. The temperature of the intake air temperature detecting element 4 depends on the thermal resistance from the intake airflow and the heat capacity of the intake air temperature detecting element 4. Accordingly, responsiveness deteriorates at a low flow rate.

Next, a method of correcting the intake air temperature detecting element 4 will be described with reference to FIG. 5. This correction means includes: the response compensation circuit 14 that applies response compensation to an output of the intake air temperature detecting element 4; a difference circuit 16 that acquires a difference between an output of the response compensation circuit 14 and an output of the temperature sensor 9; an absolutizing circuit 18 that absolutizes an output of the flow rate detecting element 13; a characteristics converting circuit 19 that converts an output of the absolutizing circuit 18 into prescribed characteristics; a multiplying circuit 17 that performs multiplication between the characteristics converting circuit 19 and the difference circuit 16; an adding circuit 15 that acquires an intake air temperature output by multiplying outputs of the multiplying circuit 17 and the response compensation circuit 14 with each other; and a characteristics adjusting circuit 20 that acquires an airflow rate output by adjusting characteristics of the output of the flow rate detecting element 13. This correction is processed by the integrated circuit 10.

Next, an operation of this correction means will be described. This correction means absolutizes the output of the flow rate detecting element 13. This is because the error of the intake air temperature detecting element 4 depends on the absolute value of the airflow rate but does not depend on polarity. The absolutization allows the configuration of the characteristics converting circuit 19 to be simplified. That is, since it is unnecessary to have data with both polarity but it is suffice to have unipolar data, the amount of data can be halved.

Next, the characteristics converting circuit 19 has input and output characteristics as shown in FIG. 6, which is the inverse function of the characteristics shown in FIG. 3, so as to correct the characteristics shown in FIG. 3. This realizes correction that increases the amount of correction at a low flow rate such as shown in FIG. 3, thereby allowing reduction in error of an output of the intake air temperature sensor.

Further, the output signal is output such that zero is output at a prescribed flow rate Qth or higher so as not to affect the output of the intake air temperature detecting element 4, and the characteristics shown in FIG. 3 is corrected at the prescribed flow rate Qth or lower. As described above, the correction only at the prescribed flow rate Qth or lower allowing simplification of the characteristics converting circuit 19 and improvement in reliability.

The difference circuit 16 is provided so as to change the amount of correction according to the difference between the output of the intake air temperature detecting element 4 and the output of the temperature sensor 9, and the multiplying circuit 17 performs multiplication between the outputs of the difference circuit 16 and the characteristics converting circuit 19. This configuration generates amount of correction that is changed according to the difference between the output of the intake air temperature detecting element 4 and the output of the temperature sensor 9 and has desired characteristics according to the airflow rate. This realizes the correction means capable of correcting complicated characteristics shown in FIG. 3, and reduces the error of the output of the intake air temperature sensor.

Next, an operation of the response compensation circuit 14 will be described. As shown in FIG. 7, the response compensation circuit 14 is a first order HPF (high pass filter). The cutoff frequency fc of this HPF is changed according to the output of the flow rate detecting element 13 as shown in FIG. 8. This configuration can prevent the responsiveness of the intake air temperature sensor from deteriorating at a low airflow rate.

In this embodiment, the temperature of the attachment base of the intake air temperature detecting element 4 is detected by the temperature sensor 9. This allows correction of adverse effects due to the temperature of the attachment base of the intake air temperature detecting element 4. Further, the intake air temperature detecting element 4 and the temperature sensor 9 are disposed to be close to each other, thereby reducing the adverse effect of the thermal time constant of the casing.

The heat equivalent circuit of the intake air temperature sensor 8 of this embodiment is represented as shown in FIG. 4, and determined by the temperatures of the intake airflow and the temperature of the attachment base of the intake air temperature detecting element 4, and the thermal resistance between the intake airflow and the attachment base of the intake air temperature detecting element 4. The temperature of the attachment base of the intake air temperature detecting element 4 depends on the temperature of the sensor fixing member 2, the thermal resistance from the sensor fixing member 2, the temperature of the circuit board 11, and the thermal resistance from the circuit board 11. The responsiveness is affected by the heat capacity of the casing. In this embodiment, the temperature of the attachment base of the intake air temperature detecting element 4 is measured by the temperature sensor 9. This can eliminate adverse effects of the temperatures of the sensor fixing member 2 and the circuit board 11. The heat capacity of the casing is significantly large, and causes a thermal time constant of several minutes, which significantly degrades the responsiveness of the intake air temperature detecting element 4. However, measurement of the temperature of the base of the fitting section of the intake air temperature detecting element 4 by temperature sensor 9 can correct the characteristics of the intake air temperature detecting element 4 without being affected by the thermal time constant of the casing.

The casing of the intake air temperature sensor 8 is provided with a concave, and the intake air temperature detecting element 4 is disposed in this concave. Accordingly, the intake air temperature detecting element 4 is disposed upstream of the intake air temperature sensor 8 without causing disturbance of the airflow in the secondary passage 7, and mechanical protection of the intake air temperature detecting element 4 is realized. As to the disturbance of the airflow in the secondary passage 7, provision of the concave allows the opening of the secondary passage 7 to be disposed more upstream than the intake air temperature detecting element 4.

As a result, this negates that the disturbance of the airflow due to the intake air temperature detecting element 4 causes disturbance in the secondary passage 7. Accordingly, the intake air temperature detecting element 4 does not affect the measurement of the airflow rate.

The intake air temperature detecting element 4 is disposed upstream of the intake air temperature sensor 8. Accordingly, the air having flown around the casing and been thermally affected by the casing does not blow against the intake air temperature detecting element 4, and the intake airflow flows on the intake air temperature detecting element 4 without being affected by another temperature. This allows more accurate detection of the intake air temperature. Further, the disposition of the intake air temperature detecting element 4 in the concave of the casing can prevent the intake air temperature detecting element 4 from being subjected to mechanical impact even in case where the intake air temperature sensor 8 drops.

The intake air temperature sensor of this embodiment includes the flow rate detecting element 13. Accordingly, the airflow rate signal can easily be output by adjusting the characteristics of the flow rate detecting element 13. The intake air temperature sensor can therefore be used as an airflow meter having the intake air temperature sensor.

Figure 9:
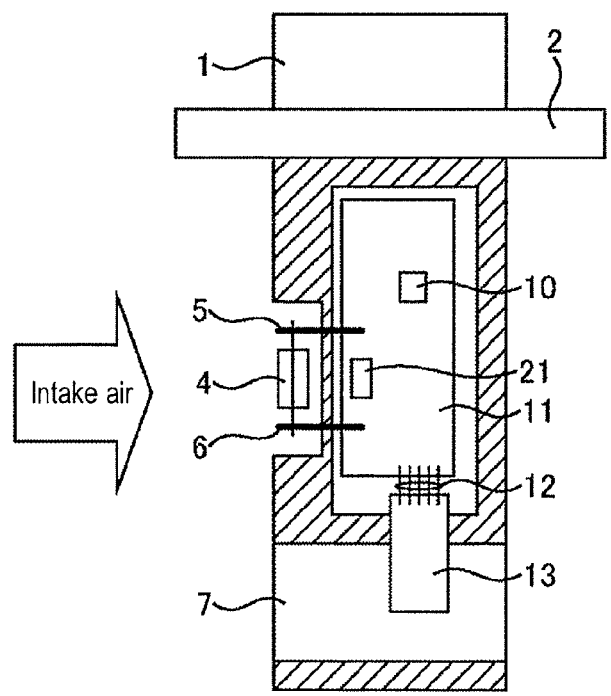
FIG. 9 is a sectional view of an intake air temperature sensor of a second embodiment taken along line A-A' of FIG. 1.

Next, an intake air temperature sensor of a second embodiment of the present invention will be described with reference to FIG. 9. FIG. 9 is a sectional view of the intake air temperature sensor of the second embodiment taken along line A-A' of FIG. 1.

The intake air temperature sensor of the second embodiment has a structure basically identical to that of the intake air temperature sensor of the first embodiment. However, following improvement is applied. In this embodiment, the fittings 5 and 6 for fixing the intake air temperature detecting element 4 extend up to the circuit board 11 so as to be thermally coupled with the circuit board 11, and temperature sensor 21 is disposed on a part of the circuit board 11 in proximity to the fittings 5 and 6. This allows the temperature sensor 21 to measure the temperature of the attachment base of the intake air temperature detecting element 4. In comparison with the first embodiment, in this embodiment, the temperature sensor 21 can easily be attached and directly be disposed directly on the circuit board 11; a chip component can be used, facilitating wiring, thereby enabling the cost to be reduced. Further, the fittings 5 and 6 extend up to the circuit board 11. This allows the intake air temperature detecting element 4 to be easily connected.

Figure 10:
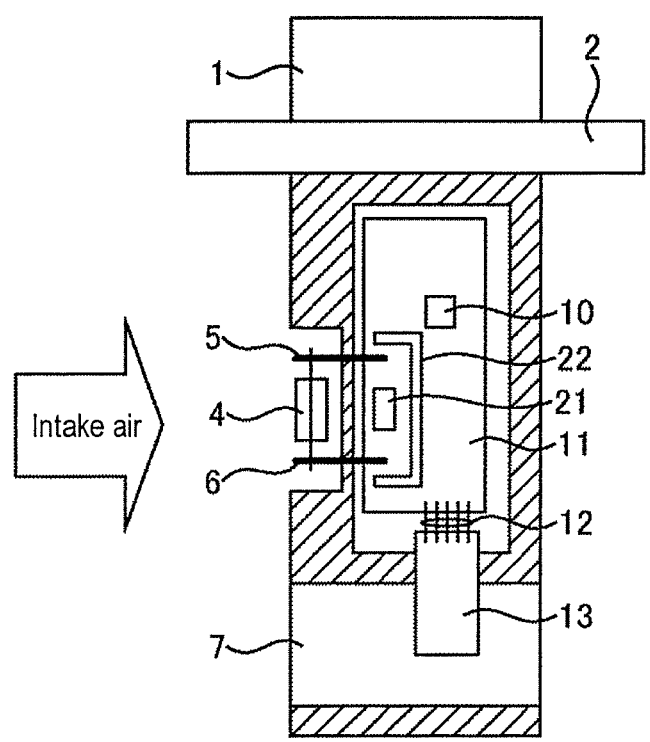
FIG. 10 is a sectional view of an intake air temperature sensor of a third embodiment taken along line A-A' of FIG. 1.

Next, an intake air temperature sensor of a third embodiment of the present invention will be described with reference to FIG. 10. FIG. 10 is a sectional view of the intake air temperature sensor of the third embodiment taken along line A-A' of FIG. 1.

The intake air temperature sensor of the third embodiment has a structure basically identical to that of the intake air temperature sensor of the second embodiment. However, following improvement is applied. In this embodiment, a rectangular U-shaped cutout 22 is provided on the circuit board 11 so as to surround the temperature sensor 21, thereby thermally insulating the temperature sensor 21. This configuration can reduce adverse effects due to heat generation of an electronic component such as the integrated circuit 10 disposed on the circuit board 11. Accordingly, the temperature of the attachment base of the intake air temperature detecting element 4 can accurately be measured by the temperature sensor 21.

Figure 11:
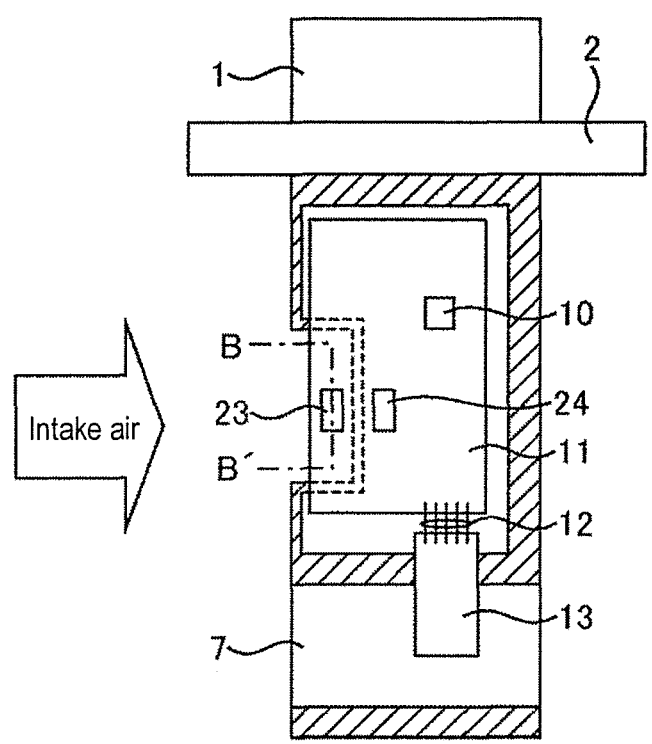
FIG. 11 is a sectional view of an intake air temperature sensor of a fourth embodiment taken along line A-A' of FIG. 1.
Figure 12:
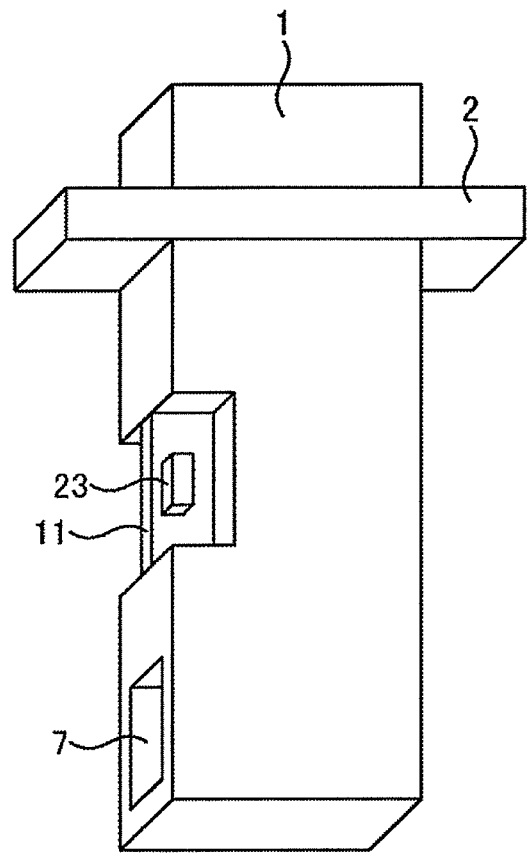
FIG. 12 is a perspective view of an intake air temperature sensor of the fourth embodiment.
Figure 13:
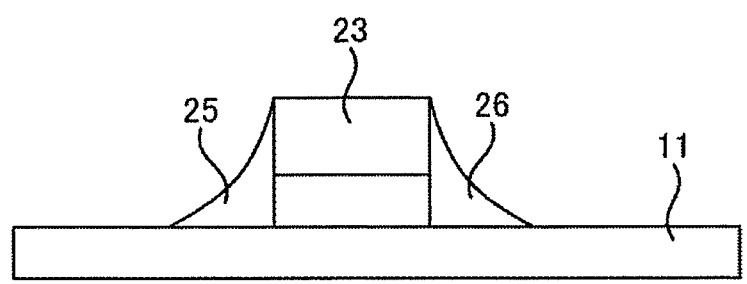
FIG. 13 is a sectional view taken along line B-B' of FIG. 11.

Next, an intake air temperature sensor of a fourth embodiment of the present invention will be described with reference to FIGS. 11, 12 and 13. FIG. 11 is a sectional view of the intake air temperature sensor of the fourth embodiment taken along line A-A' of FIG. 1. FIG. 12 is a perspective view of the intake air temperature sensor of the fourth embodiment. FIG. 13 is a sectional view taken along line B-B' of FIG. 11.

The intake air temperature sensor of the fourth embodiment has a structure basically identical to that of the intake air temperature sensor of the first embodiment. However, following improvement is applied. In this embodiment, a part of the circuit board 11 is exposed in the concave provided at the casing. An intake air temperature detecting element 23 is disposed at this part. A temperature sensor 24 is disposed in the casing of the circuit board 11. Accordingly, the intake air temperature detecting element 23 can easily be attached and be disposed directly on the circuit board 11; a chip component can be used, facilitating wiring, thereby enabling the cost to be reduced.

As shown in FIG. 13, the intake air temperature detecting element 23 is mounted apart from the circuit board 11, and mechanically and electrically connected by solder 25 and 26. The intake air temperature detecting element 23 is thus mounted apart from the circuit board 11, thereby allowing thermal resistance from the intake air temperature detecting element 23 to the circuit board 11 to be increased. In this case, the temperature of the circuit board 11 becomes the temperature of the base of the fitting section of the intake air temperature detecting element 23. Accordingly, in addition to the intake air temperature detecting element 23, the temperature of the circuit board 11 can be measured by the temperature sensor 24. This enables the correction process described in the first embodiment to be performed, thereby allowing the intake air temperature to be accurately detected. Note that provision of the concave at the casing also exerts the advantageous effects described in the first embodiment.

Next an intake air temperature sensor of a fifth embodiment will be described with reference to FIGS. 14 to 20.

Figure 14:
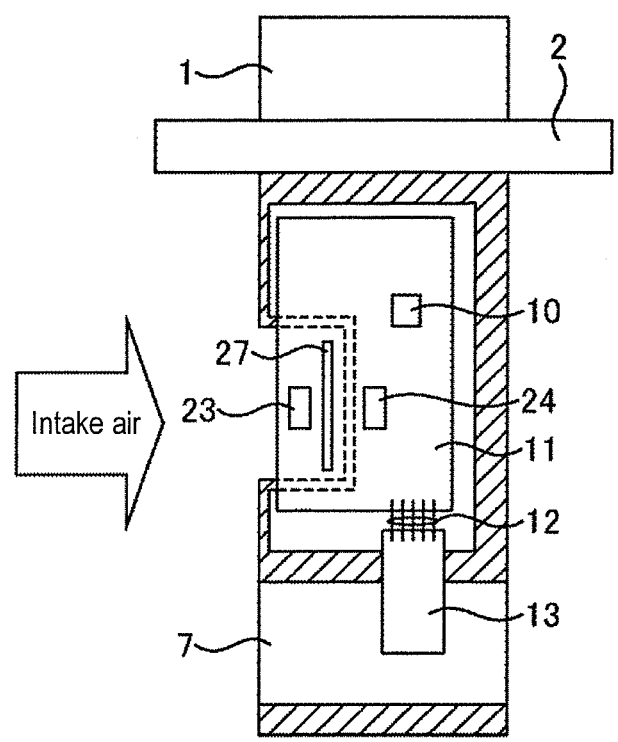
FIG. 14 is a sectional view of an intake air temperature sensor of a fifth embodiment taken along line A-A' of FIG. 1.
Figure 15:
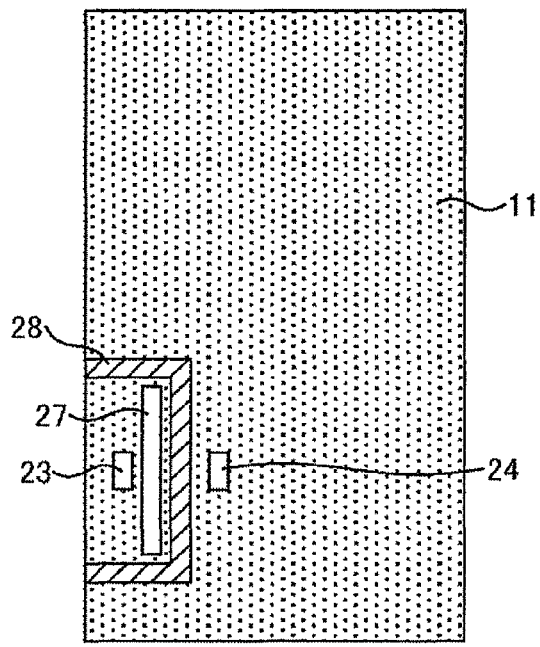
FIG. 15 is a plan view of a circuit board 11 of the fifth embodiment.
Figure 16:
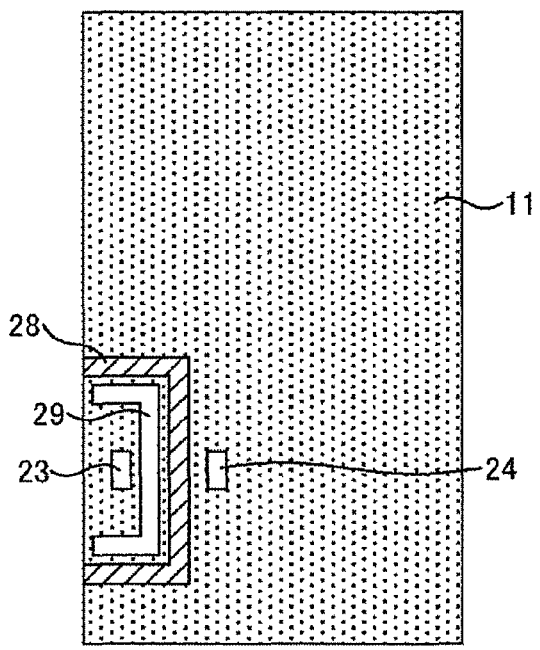
FIG. 16 is a plan view of a circuit board 11 showing a first modification of a cutout.
Figure 17:
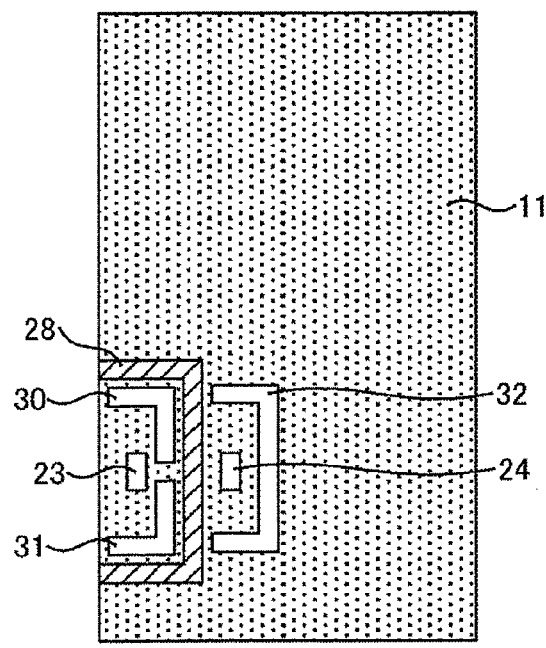
FIG. 17 is a plan view of the circuit board 11 showing a second modification of the cutout.
Figure 18:
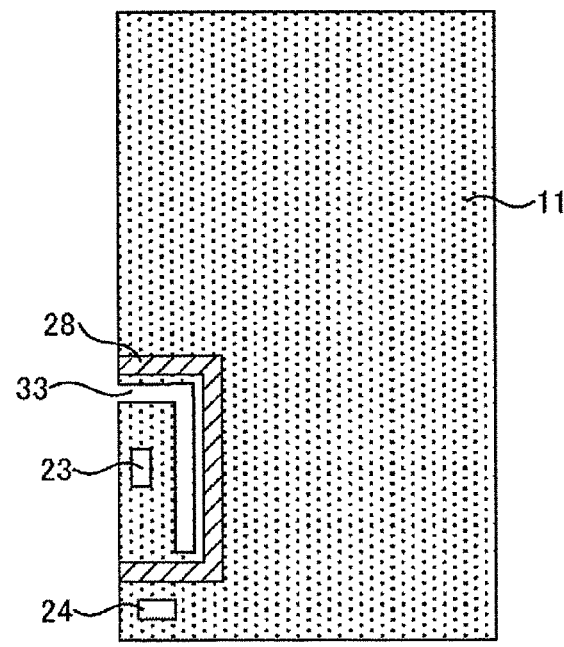
FIG. 18 is a plan view of the circuit board 11 showing a third modification of the cutout.
Figure 19:
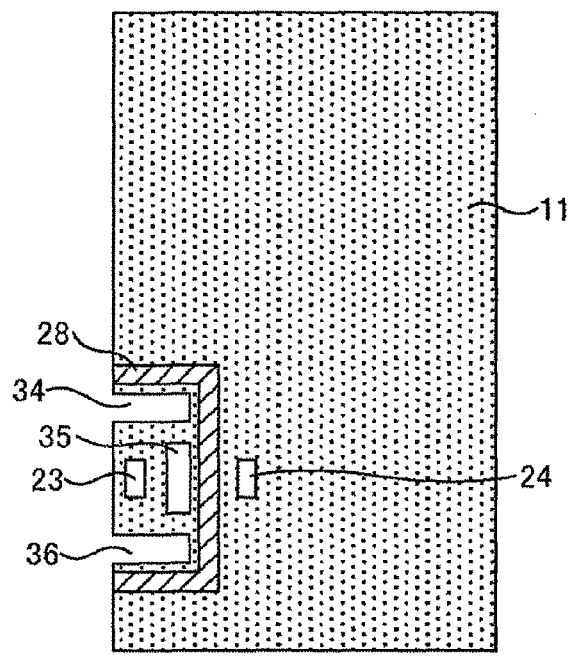
FIG. 19 is a plan view of the circuit board 11 showing a fourth modification of the cutout.
Figure 20:
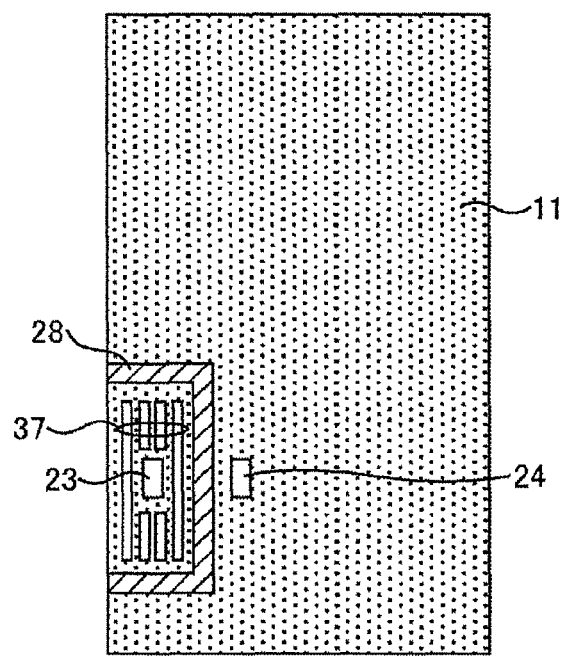
FIG. 20 is a plan view of the circuit board 11 showing a fifth modification of the cutout.

FIG. 14 is a sectional view of the intake air temperature sensor of the fifth embodiment taken along line A-A' of FIG. 1. FIG. 15 is a plan view of a circuit board 11 of the fifth embodiment. FIG. 16 is a plan view of a cutout of the circuit board 11 showing a first modification of the cutout. FIG. 17 is a plan view of the circuit board 11 showing a second modification of the cutout. FIG. 18 is a plan view of the circuit board 11 showing a third modification of the cutout. FIG. 19 is a plan view of the circuit board 11 showing a fourth modification of the cutout. FIG. 20 is a plan view of the circuit board 11 showing a fifth modification of the cutout.

The intake air temperature sensor of the fifth embodiment has a structure basically identical to that of the intake air temperature sensor of the fourth embodiment. However, following improvement is applied. In this embodiment, a cutout 27 is provided outside an adhesion part 28 between the circuit board 11 and the casing, that is, at a part of the circuit board 11 between the intake air temperature detecting element 23 and the adhesion part 28, thereby thermally insulating the intake air temperature detecting element 23. This configuration can reduce adverse effects due to heat generation of an electronic component such as the integrated circuit 10 disposed on the circuit board 11. Accordingly, the temperature of the intake air temperature detecting element 23 further approaches the intake air temperature, thereby allowing the intake air temperature to be measured more accurately. Also in this embodiment, the temperature of the circuit board 11 becomes the temperature of the base of the fitting section of the intake air temperature detecting element 23, thereby allowing the temperature sensor 24 to measure the temperature of the circuit board 11. That is, disposition of the temperature sensor 24 around the intake air temperature detecting element 23 allows the temperature to be detected at least according to the base of the fitting section of the intake air temperature detecting element 23. Accordingly, the correction process described in the first embodiment can correct the output signal of the intake air temperature detecting element 23, thereby allowing the intake air temperature to be detected more accurately. Note that heat of the casing is transmitted through the adhesion part 28 with the casing to the circuit board 11. Accordingly, it is preferable to adopt a material having a low thermal conductivity in order to reduce the thermal effect of the casing.

Next, according to a first modification of the cutout, a rectangular U-shaped cutout 29 shown in FIG. 16 may be adopted, thereby allowing thermal insulation of the intake air temperature detecting element 23 to be increased. According to a second modification of the cutout, L-shaped cutouts 30 and 31 shown in FIG. 17 may be adopted, which improves thermal insulation of the intake air temperature detecting element 23 and creates a thermal passage to the temperature sensor 24, and can more accurately measure the temperature of the attachment base of the intake air temperature detecting element 23. Further, a rectangular U-shaped cutout 32 is adopted, which improves thermal insulation of the temperature sensor 24, and can reduce adverse effects due to heat generation of an electronic component such as the integrated circuit 10 disposed on the circuit board 11. Accordingly, the temperature of the attachment base of the intake air temperature detecting element 23 can be measured more accurately, and the intake air temperature can be detected more accurately by the correction process described in the first embodiment.

According to a third modification of the cutout, an L-shaped cutout 33 shown in FIG. 18 is adopted, which improves thermal insulation of the intake air temperature detecting element 23, and creates a thermal passage to the temperature sensor 24. Further, the temperature sensor 24 is disposed at a corner of the circuit board 11. This configuration can reduce adverse effects due to heat generation of an electronic component such as the integrated circuit 10 disposed on the circuit board 11. Accordingly, the temperature of the attachment base of the intake air temperature detecting element 23 can be measured more accurately, and the intake air temperature can be detected more accurately by the correction process described in the first embodiment.

According to a fourth modification of cutouts, cutouts 34, 35 and 36 shown in FIG. 19 are adopted, which improves thermal insulation of the intake air temperature detecting element 23, creates a thermal passage to the temperature sensor 24, and can measure the temperature of the attachment base of the intake air temperature detecting element 23 more accurately. Accordingly, the intake air temperature can be detected more accurately by the correction process described in the first embodiment.

According to a fifth modification of cutouts, a plurality of cutouts 37 shown in FIG. 20, which are slit-shaped cutouts, are provided around the intake air temperature detecting element 23, which improves thermal insulation of the intake air temperature detecting element 23, causes the cutouts 37 to function as heat radiation fins, and reduce heat radiation resistance to the intake airflow. Accordingly, the intake air temperature can be detected more accurately.

Figure 21:
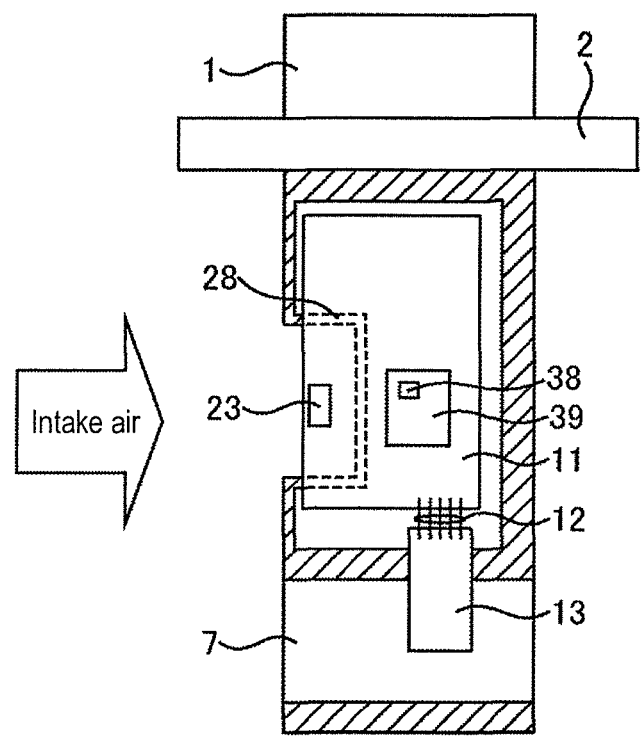
FIG. 21 is a sectional view of an intake air temperature sensor of a sixth embodiment taken along line A-A' of FIG. 1.

Next, an intake air temperature sensor of a sixth embodiment the present invention will be described with reference to FIG. 21. FIG. 21 is a sectional view of the intake air temperature sensor of the sixth embodiment taken along line A-A' of FIG. 1.

The intake air temperature sensor of the sixth embodiment has a structure basically identical to that of the intake air temperature sensor of the fourth embodiment. However, following improvement is applied. In this embodiment, an integrated circuit 39 in which a temperature sensor 38 is integrated is disposed, and the temperature of the attachment base of the intake air temperature detecting element 23 is detected by the temperature sensor 38. This allows reduction in the number of components and improvement in reliability. In this case, as to the heat generation of the integrated circuit 39, it is required to realize low power consumption, and reduce adverse effects on the temperature sensor 38.

Figure 22:
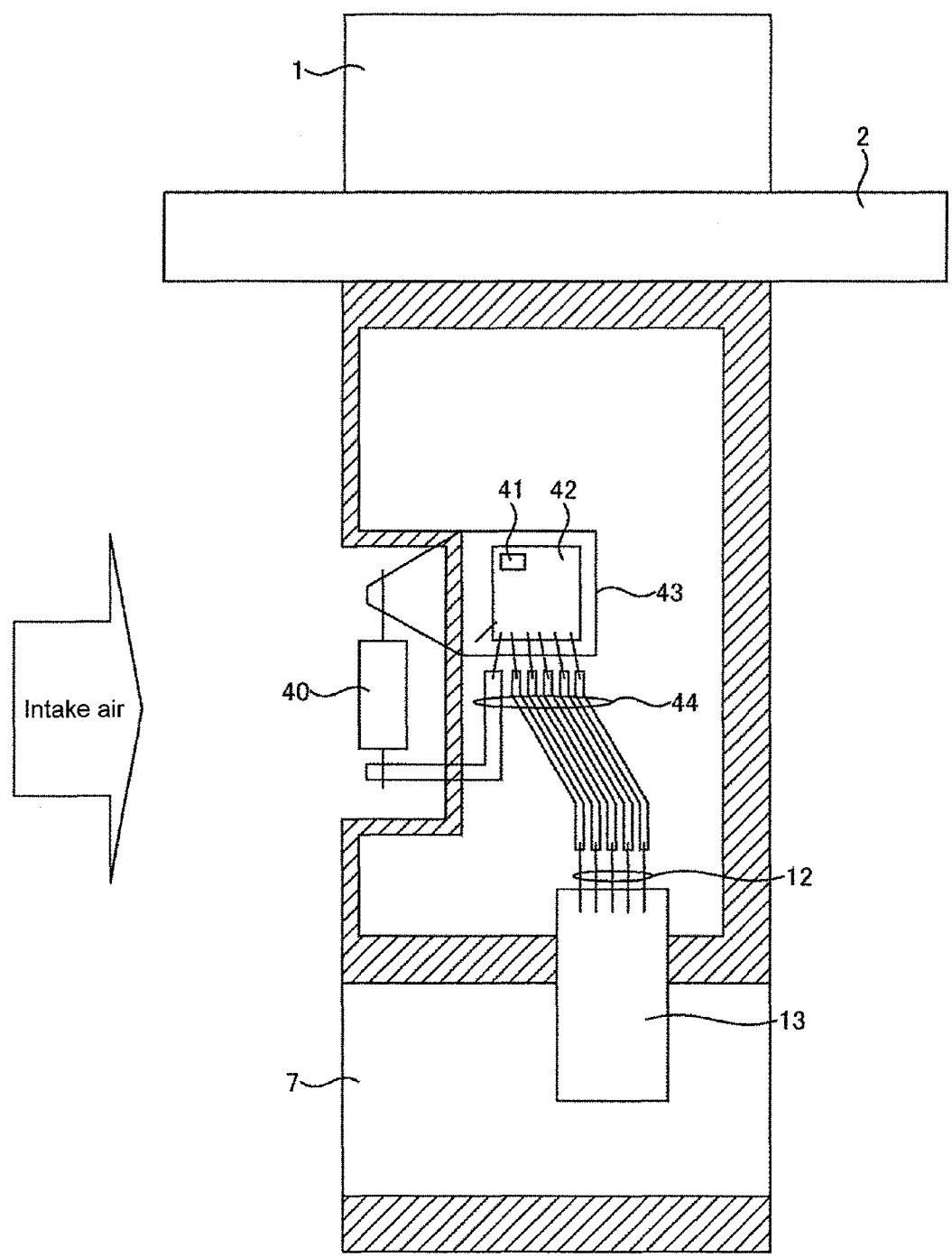
FIG. 22 is a sectional view of an intake air temperature sensor of a seventh embodiment taken along A-A' of FIG. 1.
Figure 23:
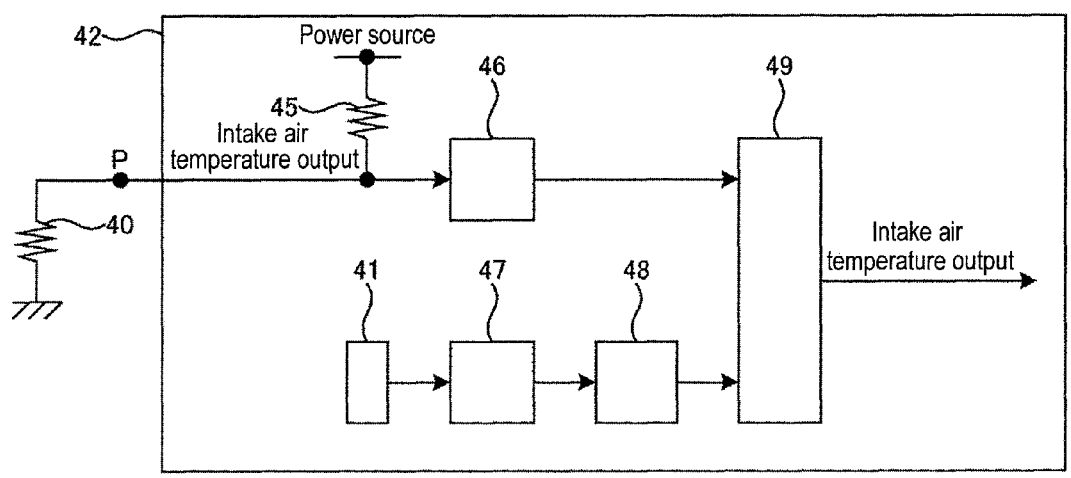
FIG. 23 is an internal block diagram of an integrated circuit 42.
Figure 24:
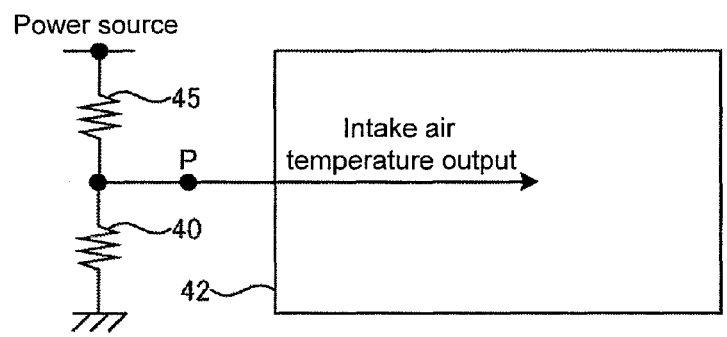
FIG. 24 is an example of usage of a thermistor resistor.

Next, an intake air temperature sensor of a seventh embodiment will be described with reference to FIGS. 22, 23, 24 and 25. FIG. 22 is a sectional view of the intake air temperature sensor of the seventh embodiment taken along A-A' of FIG. 1. FIG. 23 is an internal block diagram of an integrated circuit 42. FIG. 24 is an example of usage of a thermistor resistor. FIG. 25 shows a method of correcting an output of an intake air temperature using a resistance of a fixed resistor 45.

The intake air temperature sensor of the seventh embodiment has a structure basically identical to that of the intake air temperature sensor of the first embodiment. However, following improvement is applied. In this embodiment, leadframes 43 and 44 are employed instead of the circuit board 11. An intake air temperature detecting element 40 is fixed using the leadframes 43 and 44. An integrated circuit 42 in which a temperature sensor 41 is integrated is disposed on the leadframe 43.

In this embodiment, the temperature sensor 41 is disposed on the leadframe 43, which configures a fitting section of the intake air temperature detecting element 40, and the leadframe 43 is widened, which detects the temperature of the attachment base of the intake air temperature detecting element 40, thereby allowing the intake air temperature to be measured more accurately by the correction means shown in the first embodiment.

Further, in this embodiment, a thermistor resistor is assumed as the intake air temperature detecting element 40, and the fixed resistor 45 connected in series to the thermistor resistor is integrated into the integrated circuit 42. This facilitates detection of a brake at a point P in FIG. 23.

FIG. 24 shows an example of usage of the thermistor resistor. If the point P in FIG. 24 is broken, the intake air temperature output becomes floating and the potential is unstable. Accordingly, it is difficult to detect a brake. In contrast, in FIG. 23, if the point P is broken, the potential of the intake air temperature output is fixed to a power source voltage by the fixed resistor 45, and outputs a voltage that cannot be output when the thermistor is normally connected. This detection allows the brake at the point P to be detected.

However, since the temperature coefficient of the resistor capable of being integrated into the integrated circuit 42 is high, it is required to correct this temperature coefficient. In this embodiment, as shown in FIG. 23, the temperature of the integrated circuit 42 is detected by the temperature sensor 41, the output of the temperature sensor 41 is digitized by an A/D converter 47, and the resistance of the fixed resistor 45 is predicted by the fixed resistance predicting circuit 48. The value acquired by digitizing the intake air temperature output by the A/D converter 46 is corrected by an intake air temperature correcting circuit 49 using a predicted value of the fixed resistor 45 predicted by the fixed resistance predicting circuit 48. Note that the intake air temperature correcting circuit 49 eliminates the adverse effects of the fixed resistor 45 by performing computing process shown in FIG. 25.

DESCRIPTION OF SYMBOLS 1 connector
2 sensor fixing member
3 intake pipe
4, 23 and 40 intake air temperature detecting elements
5 and 6 fittings
7 secondary passage
8 intake air temperature sensor
9 temperature sensor
10, 39 and 42 integrated circuits
11 circuit board
12 gold wire
13 flow rate detecting element
14 response compensation circuit
15 adding circuit
16 difference circuit
17 multiplying circuit
18 absolutizing circuit
19 characteristics converting circuit
20 characteristics adjusting circuit
21, 24, 38 and 41 temperature sensors
22, 27, 29, 30, 31, 32, 33, 34, 35, 36 and 37 cutouts
25 and 26 solder
28 adhesion part
43 and 44 leadframes
45 fixed resistor
46 and 47 A/D converters
48 fixed resistance predicting circuit
49 intake air temperature correcting circuit
50 casing

What is claimed is:

1. An intake air temperature sensor including a secondary passage having an opening for taking in a part of an intake airflow, a flow rate detecting element provided in the secondary passage, an electronic circuit electrically connected to the flow rate detecting element, and a circuit mounting board mounted with the electronic circuit, and further including a casing storing at least a part of the circuit mounting board, comprising:
   an intake air temperature detecting element provided outside the secondary passage so as to be exposed to the intake airflow;
   a temperature sensor detecting a temperature around a fitting section of the intake air temperature detecting element; and
   means for correcting an output of the intake air temperature detecting element on the basis of an output of the temperature sensor and an output of the flow rate detecting element.

2. The intake air temperature sensor according to claim 1, wherein the temperature sensor is disposed on the circuit mounting board in the casing.

3. The intake air temperature sensor according to claim 2, wherein the intake air temperature detecting element is disposed on the circuit mounting board outside of the casing.

4. An airflow meter comprising the intake air temperature sensor according to claim 3.

5. An airflow meter comprising the intake air temperature sensor according to claim 2.

6. The intake air temperature sensor according to claim 1, wherein the casing is made of a material with a low thermal conductivity.

7. An airflow meter comprising the intake air temperature sensor according to claim 6.

8. The intake air temperature sensor according to claim 1, further comprising
temperature difference correction means for correcting an output of the intake air temperature detecting element according to a difference between a temperature detected by the temperature sensor and a temperature detected by the intake air temperature detecting element.

9. An airflow meter comprising the intake air temperature sensor according to claim 8.

10. The intake air temperature sensor according to claim 1, further comprising
means for applying response compensation to an output of the intake air temperature detecting element according to a flow rate signal detected by the flow rate detecting element.

11. An airflow meter comprising the intake air temperature sensor according to claim 10.

12. The intake air temperature sensor according to claim 1, further comprising:
a fixed resistor connected in series to the intake air temperature detecting element;
fixed resistor correction means for correcting a resistance of the fixed resistor on the basis of a value of the temperature sensor; and
means for correcting an output of the intake air temperature detecting element on the basis of an output of the fixed resistor correction means.

13. The intake air temperature sensor according to claim 12,
wherein the fixed resistor is disposed in an integrated circuit.

14. An airflow meter comprising the intake air temperature sensor according to claim 1.

15. The intake air temperature sensor including a secondary passage having an opening for taking in a part of an intake airflow, a flow rate detecting element provided in the secondary passage, an electronic circuit electrically connected to the flow rate detecting element, and a circuit mounting board mounted with the electronic circuit, and further including a casing storing at least a part of the circuit mounting board, comprising:
an intake air temperature detecting element provided outside the secondary passage;
a temperature sensor detecting a temperature around a fitting section of the intake air temperature detecting element; and
means for correcting an output of the intake air temperature detecting element on the basis of an output of the temperature sensor and an output of the flow rate detecting element, and
wherein the temperature sensor is disposed on the circuit mounting board in the casing,
wherein the intake air temperature detecting element is disposed on the circuit mounting board outside of the casing, and
wherein a cutout is provided at a part of the circuit mounting board around the intake air temperature detecting element.

16. The intake air temperature sensor according to claim 15,
wherein a concave is provided at a part of the casing, and a part of the circuit mounting board is exposed in the concave.

17. An airflow meter comprising the intake air temperature sensor according to claim 15.

18. An airflow meter comprising the intake air temperature sensor according to claim 16.

19. The intake air temperature sensor including a secondary passage having an opening for taking in a part of an intake airflow, a flow rate detecting element provided in the secondary passage, an electronic circuit electrically connected to the flow rate detecting element, and a circuit mounting board mounted with the electronic circuit, and further including a casing storing at least a part of the circuit mounting board, comprising:
an intake air temperature detecting element provided outside the secondary passage;
a temperature sensor detecting a temperature around a fitting section of the intake air temperature detecting element;
means for correcting an output of the intake air temperature detecting element on the basis of an output of the temperature sensor and an output of the flow rate detecting element,
temperature difference correction means for correcting an output of the intake air temperature detecting element according to a difference between a temperature detected by the temperature sensor and a temperature detected by the intake air temperature detecting element; and
means for changing a gain of the temperature difference correction means when a flow rate detected by the flow rate detecting element is lower than a prescribed flow rate.

20. An airflow meter comprising the intake air temperature sensor according to claim 19.

* * * * *